W. E. GILROY.
CHECK ROW CORN PLANTER.
APPLICATION FILED OCT. 16, 1908.
1,019,038.
Patented Mar. 5, 1912.
3 SHEETS—SHEET 1.
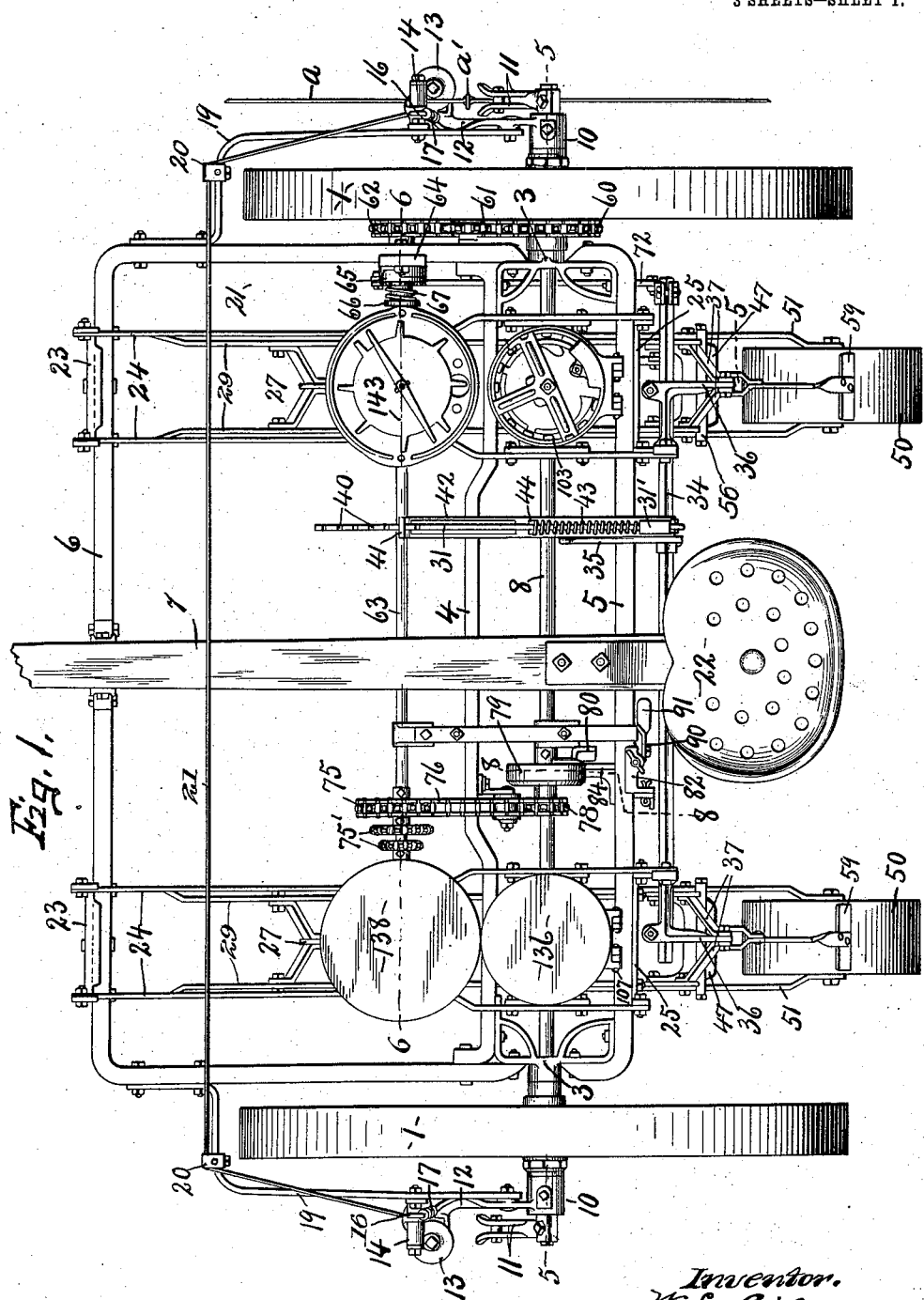

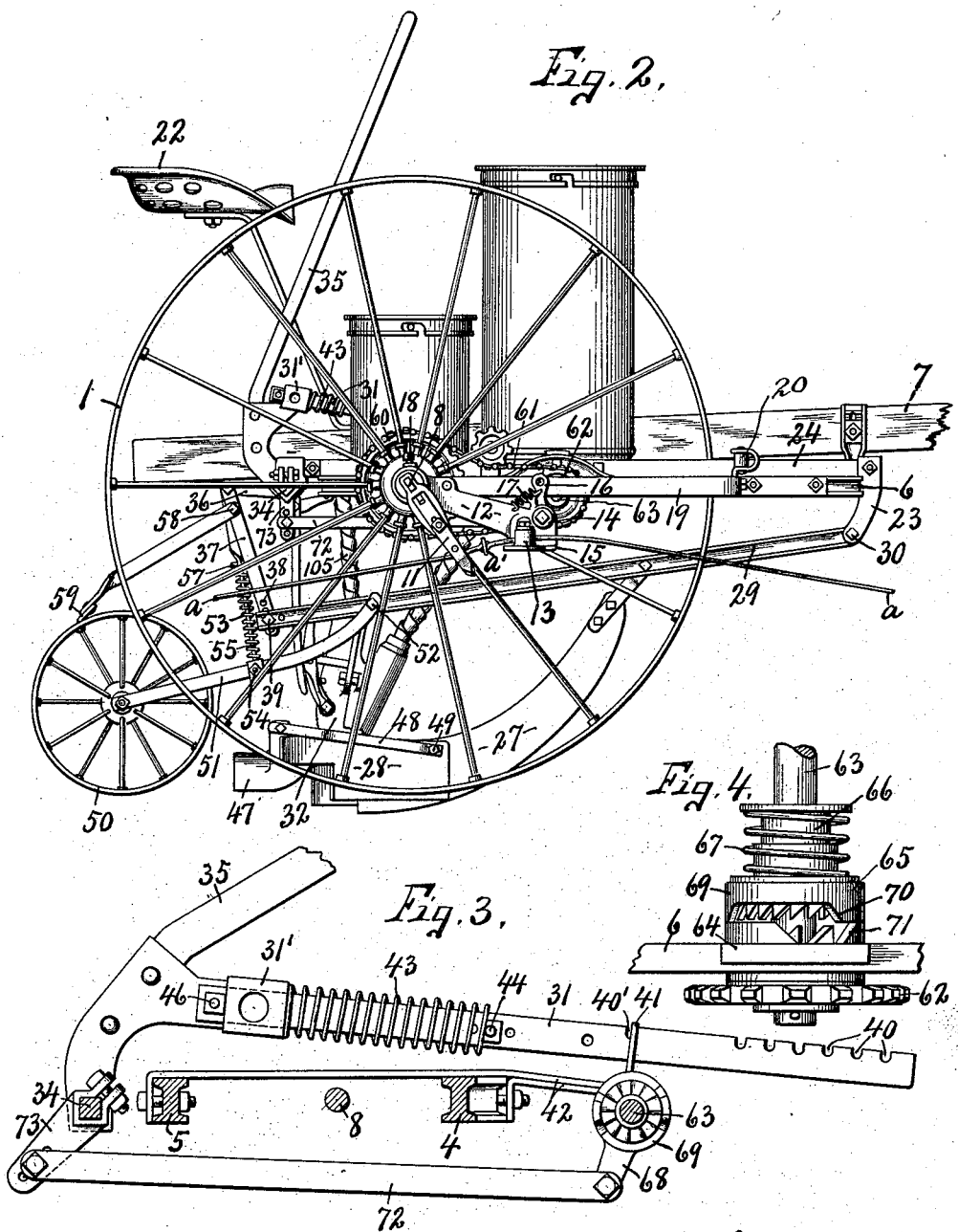

W. E. GILROY.
CHECK ROW CORN PLANTER.
APPLICATION FILED OCT. 16, 1908.
1,019,038.
Patented Mar. 5, 1912.
3 SHEETS—SHEET 3.
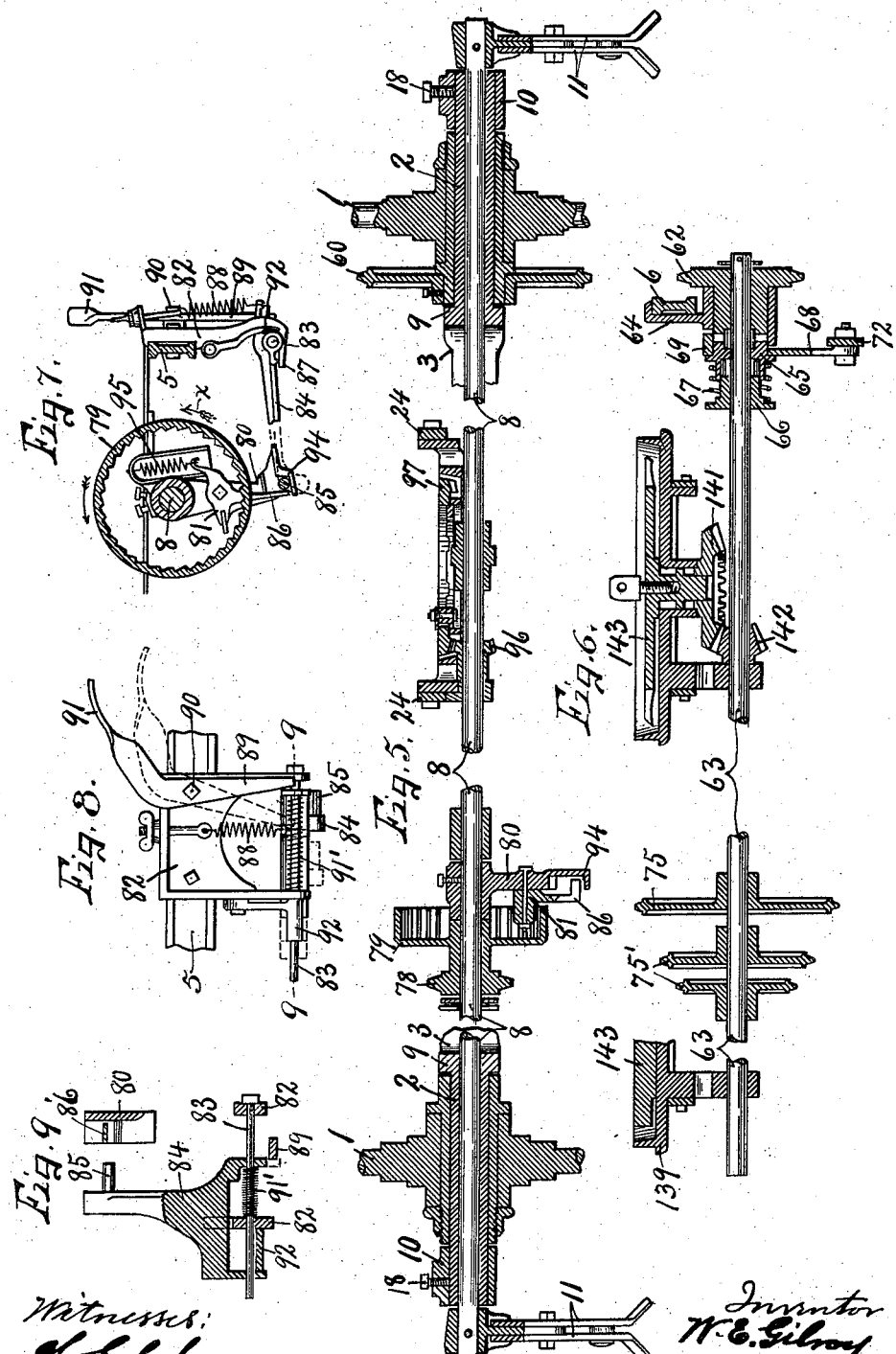

UNITED STATES PATENT OFFICE.

WILLIAM EDWARD GILROY, OF UTICA, NEW YORK, ASSIGNOR TO EUREKA MOWER COMPANY, OF UTICA, NEW YORK, A CORPORATION OF NEW YORK.

CHECK-ROW CORN-PLANTER.

1,019,038. Specification of Letters Patent. Patented Mar. 5, 1912.

Application filed October 16, 1908. Serial No. 458,088.

*To all whom it may concern:*

Be it known that I, WILLIAM E. GILROY, of Utica, in the county of Oneida, in the State of New York, have invented new and useful Improvements in Check-Row Corn-Planters, of which the following, taken in connection with the accompanying drawings, is a full, clear, and exact description.

This invention relates to certain improvements in check-row corn-planters involving the use of a two-wheeled running gear or sulky and suitable corn and fertilizer feeding mechanisms controlled by the usual knotted check wire or cable along which the machine is drawn for depositing corn and fertilizer uniform distances apart thereby planting the corn in squares or intersecting rows so that the grown corn may be cultivated in both directions by the usual wheel cultivators.

The primary object of my present invention is to deposit the corn and fertilizer in the ground at a uniform depth and at the same time to carry the load of the corn and fertilizer together with the furrow plows and mechanisms for controlling the feed of the corn and fertilizer more nearly in the vertical plane of the axis of the wheels so that when the driver is sitting upon the seat, the weight of the frame and mechanism secured thereby is substantially balanced on said axis.

Other objects and uses relating to specific parts of the machine will be brought out in the following description.

In the drawings—Figures 1 and 2 are respectively a top plan and a side elevation of a check row corn planter embodying the various features of my invention showing a portion of the knotted check row cable along which it is adapted to travel. Fig. 3 is an enlarged elevation partly in section of the clutch shifting mechanism for connecting and disconnecting the traction wheels to and from the mechanisms which control the feed of the corn and fertilizer, the operating lever being partly broken away and is also utilized to control the position of the furrow plow. Fig. 4 is an enlarged top plan of the clutch just previously referred to. Fig. 5 is an enlarged transverse sectional view taken on line 5—5, Fig. 1, showing particularly the check row shaft as passing through the hubs of the wheels and also showing a portion of one of the corn feeding mechanisms, and ratchet clutch by which the check row shaft is connected and disconnected to and from the countershaft, portions of the check row shaft being broken away. Fig. 6 is an enlarged sectional view taken on line 6—6, Fig. 1, showing the counter-shaft partly broken away and also showing the clutch by which said countershaft is connected to and disconnected from the main driving wheel, portions of the fertilizer feeding mechanisms being also shown in section. Fig. 7 is an enlarged transverse sectional view taken on line 8—8, Fig. 1. Fig. 8 is a rear elevation of the shaft and locking mechanism for the tripping member of the ratchet pawl. Fig. 9 is a horizontal sectional view taken on line 9—9, Fig. 8 showing the tripping member in its locked or inoperative position and also showing a portion of the pawl and its supporting member.

The entire mechanism is supported by suitable wheels —1— which are journaled upon hollow axle stubs —2— forming integral parts of separate brackets —3—. These brackets are secured to and between a pair of substantially parallel bars —4— and —5— which are disposed in a horizontal plane at the front and rear of the axes of the wheels and constitute a part of the main supporting frame, the wheels being spaced apart a sufficient distance to receive between them mechanism for planting two rows of corn at a time.

A U-shape bar —6— has its opposite arms secured to the bracket —3— and also to the opposite ends of the bar —4— and extends forwardly some distance beyond the front sides of the wheels where it forms a convenient support for a pole —7— and the front ends of suitable plow or furrow opener supporting frames hereinafter described.

The bars —4—, —5— and —6— preferably consist of channel irons and together with the brackets —3— constitute the main supporting frame upon which corn planter mechanisms, hereinafter described are mounted.

A check row shaft —8— extends from side to side of a main supporting frame between the bars —4— and —5— and has its opposite end passed through and journaled in the tubular axle stubs —2— as best seen in Figs. 1 and 5.

The inner ends of the axle stubs —2— are provided with shoulders —9— engaging the inner ends of the hubs while the outer ends are extended some distance beyond the corresponding ends of the hub and are provided with collars —10— for holding the hubs and wheels against undue axial movement.

The opposite extremities of the check row shaft —8— extend some distance outwardly beyond the corresponding ends of the axle stubs —2— and are preferably angular in cross section for receiving and supporting radially projecting arms —11— having angular sockets or apertures fitting upon the angular ends of the check row shaft so as to rotate with said shaft in fixed relation thereto. When the check row shaft is at rest these arms extend downwardly and forwardly in practically the same inclined plane although only one of them is engaged at a time and their lower ends are preferably furcated forming a guide for a knotted cable —a— and also forming abutments adapted to be engaged by knots —a'— with which said cable is provided at regular intervals of say 3 ft. apart. While the machine is being drawn across the field by any suitable power the cable is held up in position to ride through the furcated end of the arm —11— by a suitable bracket —12— having guide rollers or sheaves —13— and —14— between which the cable passes, the rollers —13— being mounted upon a swinging bracket —15—, which is held in place by a movable detent —16—, the latter being held in operative position by a spring —17— so that by releasing the detent the bracket —15— with the roller —13— thereon may drop downwardly to allow the cable to be lifted by hand and placed between the rollers —13— and —14— after which the bracket —15— with the roller —13— thereon is rocked to its closed position and held by the detent. The guide rollers —13— and —14— are placed a short distance in advance of the furcated arm —11— and together with said arm are located a sufficient distance beyond the outer side of the wheel to prevent friction between the cable and wheel while the machine is being drawn along the ground.

Each of the arms —12— forms an integral part of the collar —10— which is fastened to the tubular axle stub —2— by a set screw —18— but together with said arm is additionally held against rotation by a brace —19— which is fastened to the arm —12— and extends forwardly in front of the adjacent wheel where it is secured to the rearwardly extending arm of the U-shape bar —6— as best seen in Fig. 1. Mounted upon these braces —19— are guide sheaves or loops —20— around which is passed a cord or cable —21— having its ends attached to the detents —16— so that the operator may grasp the central portion of the cable and by drawing the same rearwardly, trip the detents —16— against the action of the spring —17— to release the check row cable —a— from the guide rollers —13— and —14—, it being understood that the central portion of the cord —21— is within easy reaching distance from the seat as —22— which is mounted upon the rear end of the pole —7— some distance rearwardly from the check row shaft —8—.

The pole —7— is secured to the upper side of the main supporting frame by any suitable fastening means substantially midway between the wheels and also substantially midway between opposite sides of the main supporting frame. A pair of brackets —23— are secured to the front bar —6— equi-distant from and at opposite sides of the pole —7—, said brackets extending above and beneath the bar —6— and to each bracket is secured the front ends of rearwardly extending tie bars —24— which are spaced some distance apart and are secured at their rear ends to brackets —25— on the rear bar —5— thereby tying the front and rear portions of the main frame together intermediate their ends and forming a convenient support for the plates upon which certain movable parts of the feeding mechanisms for the fertilizer and corn are mounted as will be hereinafter described.

In this particular instance I have shown two corn planters and phosphate feeding mechanisms and a corresponding number of furrow plows, one for each planter and inasmuch as both planters are identical, I will proceed to describe only one of them which consists primarily of the furrow plow, the corn feeding mechanism and the mechanism for controlling the feed of the fertilizer.

The furrow plow is of the usual construction comprising a center blade —27— having its rear end adapted to contact with the ground and provided with rearwardly diverging blades —28— for throwing the dirt laterally from the center blade —27— thereby forming the furrow as the machine is drawn along over the ground. This furrow plow is mounted upon a vertically swinging frame —29— having its front end pivoted at —30— to the downwardly projecting arms of the bracket —23— and is, therefore located some distance below the horizontal plane of the main supporting or swinging frame. This plow supporting frame —29— inclines downwardly and rearwardly from its pivotal connection —30— with the brackets —23— some distance below and rearwardly beyond the check row shaft —8— but above the plow. The front end of the center blade —27— of the plow is curved upwardly and is secured to the vertically swinging frame —29— between its pivot —30— and vertical plane of the axis of the wheels —1— while its rear end is secured to a hanger or bracket —32— depending from and secured to the vertically swinging frame —29— as best seen in Fig. 2, whereby the plow may be adjusted vertically to form the desired depth of furrow or may be elevated clear from the ground as when the machine is being drawn from place to place without requiring the operation of the corn feeding mechanism.

The means for raising and lowering the vertically swinging frame —29— and plow mounted thereupon preferably consists of a rock-shaft —34— having an upwardly extending hand lever —35— rigidly secured thereto and also provided with rearwardly extending crank arms —36— which are connected by links —37— to the rear end of the frames —29— as best seen in Fig. 1, the lower end of each link —37— being provided with a series of apertures —38— for receiving a bolt —39— and permitting the vertical adjustment of the frame —29— irrespective of the operation of the hand lever —35—.

The swinging frame —39— and plow carried thereby is held in its adjusted position by a detent —31— having its rear end slidably seated in a bracket —31'— on the lever —35— above the rock shaft —34— and its front end provided with teeth or notches —40— movable into and out of engagement with a stop shoulder —41— forming a part of a bar —42— which is mounted upon the main supporting frame or rather is secured to the upper sides of the bars —4— and —5— as best seen in Figs. 1 and 3.

Surrounding the rear portion of the detent —31— is a coil spring —43— having one end abutting against the front face of the bracket —31'— and its other end abutting against a stop shoulder —44— so that when the detent —31— is interlocked with the stop shoulder —41—, the bracket —31'— is free to slide forwardly against the spring —43— but is prevented from displacement from the detent —31— by a stop shoulder —46— engaging the rear end of the bracket —31'— as best seen in Figs. 2 and 3. This spring, therefore, operates to hold the plow in the ground under spring pressure and at the same time permits it to yield upwardly in case the plow should strike a large stone or stump.

It will be observed upon reference to Fig. 2 that the furrow digging portion of the plow is located directly under the axis of the wheels and that the chutes for the corn and fertilizer discharge approximately at the same point or in a vertical plane directly under the same axis which is also the line of contact of the wheels with the ground and, therefore, the furrow plow and discharge ends of the chutes rise and fall with the wheels thereby making the furrow and depositing the corn and fertilizer at a uniform depth throughout the row.

Immediately following the rear end of the plow is a covering device —47— consisting of a cast metal plate having downwardly projecting rearwardly tapering sides for the purpose of drawing the earth from the sides into the furrow immediately after the corn and fertilizer have been deposited therein to effectively cover the same. This covering device preferably floats upon the surface of the ground, being held down by its own weight and for this purpose is mounted upon the rear end of a vertically swinging frame —48— which extends around the sides of the chute and is pivoted at its front end at —49— to the plow blade —27— in front of the chutes hereinafter described.

Immediately following the floating covering device —47— at the rear thereof is a tamping wheel or roller —50— which is journaled on the rear end of a vertically swinging frame —51— having its forward end pivoted at —52— to the rearwardly extending vertically movable frame —29—, said frame —51— together with the wheel —50— being yieldingly pressed downward by a coil spring —53— which allows the wheel to move vertically against the action of the spring in passing over obstructions, the object of the wheel or roller —50— being to press the earth covering over the seed and fertilizer after the latter has been deposited in the furrow and covered with dirt. The downward movement of the frame —51— and its covering wheel —50— is limited by a stop —54— which is adjustable in a vertical bar —55—, said frame —51— being provided with a perforated cross bar —56— through which the bar —55— passes, the latter being encircled by the spring —53— having its lower end bearing against the cross bar —56— and its upper end engaging a stop —57— on the bar —55—. The upper end of this bar —55— is secured to the link —37— by a bolt —58— which also serves as a pivot for a scraper arm carrying a scraper —59—which bears upon the periphery of the wheel or roller —50— to remove the dirt which may adhere thereto.

The downward movement of the covering device 47 is limited by the engagement of its supporting frame —48— with the upper edges of the outer rearwardly diverging blades —28— of the furrow plow —27— and it is now evident that the same adjusting mechanism for raising and lowering the plow supporting frame —29— also serves to raise and lower the covering device —47— and wheel or roller —50—, the latter having an independent adjustment to increase the tension of the spring —53— and thereby increase the pressure of the wheel or roller upon the covered furrow, this separate adjustment being effected by providing the bar —55— with a series of apertures for receiving the limiting stop —54—.

The operation of the check row shaft is controlled by the knots or stops —a'— on the check row wire —a— acting in conjunction with one or the other of the arms —11— according to the side of the machine at which the check wire is located while the check shaft —8— controls the feeding of the seed corn and fertilizer of both sets of mechanisms as follows: Secured to the hub of one of the wheels as the right hand wheel —1— is a sprocket wheel —60— which is connected by a chain —61— to a somewhat smaller sprocket wheel —62—, the latter being loosely mounted upon the corresponding end of a counter-shaft —63— and is provided with a hub loosely journaled in a bracket —64— on the adjacent rearwardly projecting arm of the bar —6— and is provided on its inner face with clutch teeth adapted to be engaged by a sliding clutch section —65— on the counter-shaft —63—, said clutch section having a sliding interlocking engagement with a collar —66— which is rigidly secured to the counter-shaft. The clutch section —65— is normally forced into engagement with the adjacent end of the hub of the sprocket wheel —62— by means of a coil spring —67— and is adapted to be forced out of operative connection with the hub of said sprocket wheel by means of a lever —68— having a collar —69— loosely journaled upon the adjacent end of the clutch section —65— and rotatable independently thereof, the collar —69— being provided with a cam face —70— coacting with a similar cam —71— on the inner end of the bracket —64— as best seen in Fig. 4 so that by rocking the arm —68— in one direction as for instance rearwardly, the cam —70— will ride upon the fixed cam —71— and thereby force the clutch section —65— axially against the action of the spring —67— and out of connection with the sprocket wheel —62— leaving the latter free to rotate independently of the counter-shaft as the machine is drawn along the ground and thereby preventing the operation of the check row shaft when the check wire is disconnected from the machine as in driving to and from the field. The operation of the clutch —65— is controlled by the extreme forward movement of the lever —35— through the medium of a link —72— which connects the arm —68— with a crank arm —73— on the rock shaft 34 to which the lever —35— is fixed and in order to hold the clutch in its inoperative position the link 31 is provided with an additional notch —40'— adapted to interlock with the stop or detent —41— as best seen in Fig. 3. This counter-shaft —63— is mounted upon the main supporting frame some distance in front of and parallel with the check shaft —8— and is provided near its left hand end with a sprocket wheel —75— which is connected by a chain —76— to a sprocket wheel —78— on the check shaft —8— and preferably integral with an internal ratchet wheel —79— as best seen in Fig. 5. This sprocket wheel 78 and ratchet wheel —79— are loose on the check shaft —8— and secured to this check shaft at one end of the ratchet wheel —79— is a radially projecting arm —80— carrying a pawl —81— adapted to be moved into and out of engagement with the teeth of the ratchet wheel —79— as best seen in Figs. 5 and 7.

Secured to the rear frame bar —5— is a bracket —82— carrying a horizontal guide rod —83— upon which is guided a horizontally movable arm —84— projecting forward from its supporting guide —83— and carrying at its forward end a laterally projecting pin —85— which is movable into and out of the path of a pendant arm —86— on the pawl —81—. This forwardly projecting arm —84— is normally held against a limiting stop —87— by a spring —88— and is adapted to be shifted along the guide —83— by a lever —89— which is pivoted at —90— to the bracket —82— and is provided at its upper end with a foot or hand engaging portion —91— by the depression of which the arm —84— is moved laterally against the action of a spring —91'— to throw the pin —85— out of the path of movement of the tripping arm —86— of the pawl —81—, said arm being held in its inoperative position by a detent —92— as best seen in Figs. 8 and 9 in which position the machine may be used without the check wire for drilling or planting the corn at shorter intervals than when used in connection with the check wire as will be hereinafter more clearly described in connection with the feeding mechanisms for the corn and fertilizer. When the check wire is used the detent —92— is thrown by hand out of holding position allowing the arm —84— to be returned by the retracting spring —91'— to bring the pin —85— into the path of the tripping arm —86— of the pawl —81—. The pin —85— normally rests in a suitable seat —94— on the lower end of the arm —80— in which position the trip arm —86— is engaged by the pin —85— to hold the pawl —81— out of engagement with the teeth of the ratchet wheel —79— but as soon as the check shaft is rocked by the engagement of one of the knots or abutments —a'— on the check wire —a— with the furcated arm —11—, the arm —80— which is rigid on the check shaft —8— is rocked in the direction indicated by the arrow, Fig. 7, thereby withdrawing said arm from the pin —85— and causing the trip arm —86— to ride over the top of the pin until withdrawn from engagement therewith whereupon the pawl —81— is immediately thrown into engagement with the teeth of the ratchet wheel —79— by its retracting spring —95—, Fig. 7. This latter operation locks the wheel —79— to the check row shaft and owing to the fact that this ratchet wheel is driven continuously from the countershaft —63— it is evident that the rotation of the check shaft will be continued through a complete revolution after the knot on the check wire has released itself from the arm —11—. As the arm —80— completes its revolution its lower end is again brought into engagement with the pin —85— thereby slightly elevating the free end of the rock arm —84— against the action of the spring —88— and bringing the pin into position to be engaged by the trip arm —86— which trips the pawl —81— thereby freeing the ratchet wheel —79— from and further stopping further rotation of the check shaft —8— leaving the arm —11— in position to be engaged by the next succeeding knot —a'— of the check wire —a— whereupon the operation is repeated, as often as one of the knots —a'— is engaged with the arm —11—.

In order that the check row shaft may be driven at the desired speed, I provide the counter-shaft —63— with additional sprocket wheels —75'—, either of which may be moved into the position occupied by the sprocket wheel —75— and used in place thereof.

The separating, feeding and delivering mechanism for the corn and fertilizer forms the subject matter of my pending application #625,477, filed May 6, 1911 and need not therefore be herein described further than to state that the receptacles as —136— one of which is shown at the left hand of Fig. 1 are supported directly over the check shaft —8— upon the frame bars —24— and are provided with rotary bottom plates or feeding rings —103— which are driven by pinions —96— on the shaft —8— and suitable gears —97— meshing therewith, one of the gears and intermeshing pinion being shown in Fig. 5, while the corn feeding ring —103— is shown at the right of Fig. 1. After the corn is separated by the feeding rings —103— it is conducted through suitable chutes —105— to points in the furrow nearly directly under the check shaft between the holes. In like manner a pair of fertilizer receptacles —138—, one of which is shown at the left of Fig. 1 are mounted upon the frame bars —24— directly over the counter shaft —63— and are provided with rotary bottom plates —143— one of which is shown at the right of Fig. 1. These fertilizer feeding plates —143— are driven from the counter shaft —63— through the medium of pinions —142— on the counter shaft and gears —141— meshing therewith, one of the feeding plates and intermeshing gears being shown in section in Fig. 6 and in top plan in Fig. 1.

The operation of my invention will now be readily understood upon reference to the foregoing description and accompanying drawings.

What I claim is:

1. In combination with the wheels of a check-row seed-planter, a check-row shaft passed through the hubs of the wheels, mechanism actuated by one of the wheels for rotating the shaft intermittingly one complete revolution at a time and seed-feeding mechanism actuated by said shaft.

2. In a check-row seed-planter, a frame, hollow axle stubs rigid on the frame, wheels journaled on the stubs, a check-row shaft passing through and journaled within the stubs, mechanism actuated by one of the wheels for rotating the shaft intermittingly one complete revolution at a time and seed-feeding mechanism actuated by said shaft.

3. In a check-row seed-planter, a frame and supporting wheels therefor in combination with seed-feeding means located in the vertical plane of the axis of the wheels, a straight check-row shaft passing through the hubs of the wheels and controlling the action of the seed-feeding means, mechanism actuated by one of the wheels for operating the check shaft intermittingly one complete revolution at a time and additional means coacting with said mechanism for stopping the rotation of said shaft at the end of each complete revolution.

4. In combination with the wheels of a check-row seed-planter, a straight check-row shaft coaxial with and extending through the hubs of the wheels, a revoluble member on the check-row shaft, means for transmitting motion from one of the wheels to said member, additional means brought into action by a partial rotation of the shaft for locking said shaft to the revoluble member whereby the shaft is rotated and additional means coacting with the last named means for disconnecting the shaft from the revoluble member at the end of a complete revolution.

5. In combination with the wheels of a check-row seed-planter, a straight shaft passing through the hubs of the wheels and normally at rest, a ratchet wheel loose on the shaft, means for transmitting rotary motion from one of the first named wheels to the ratchet wheel, means actuated by a partial rotation of the shaft for locking said shaft to the ratchet wheel to rotate therewith and additional means coacting with the last named means for stopping the rotation of the shaft after one complete revolution.

6. In a check-row seed-planter, a frame and supporting wheels therefor, a check-row shaft passing through the hubs of the wheels and normally at rest, a ratchet wheel loose on the shaft, means for transmitting rotary motion from one of the first named wheels to the ratchet wheel, an arm secured to the shaft, a pawl on the arm for engaging the teeth of the ratchet wheel, means normally holding the pawl out of engagement with the ratchet wheel, additional means brought into action by partial rotation of the shaft for disengaging the pawl from its holding means, automatic means for forcing the pawl into engagement with the teeth of the ratchet wheel for transmitting rotary motion from the ratchet wheel to the shaft, said pawl holding means being arranged to engage and trip the pawl at the end of a complete rotation of the shaft, and seed-feeding means brought into action by the rotation of said shaft.

7. In a check-row seed-planter, a frame and supporting wheels therefor in combination with a check shaft passing through the hubs of the wheels and provided at its ends with means for engaging a check wire, whereby the shaft is rocked through part of a revolution, said shaft being normally at rest, a revoluble member loose on the shaft, means for transmitting rotary motion from one of the wheels to said member, additional means brought into action by the partial rotation of the shaft for locking said shaft to the rotary member to rotate therewith, additional means coacting with the last named means for disconnecting the last named means from the rotary member and thereby stopping the shaft after a complete revolution and seed-feeding means actuated by the complete rotation of the shaft.

8. In a check-row seed-planter, a frame and supporting wheels therefor, a check shaft passing through the hubs of the wheels and having its ends provided with means for engaging the check wire whereby the shaft is rotated part of a revolution, a ratchet wheel loose on the shaft, means including a clutch for transmitting rotary motion from one or the first named wheels to the ratchet wheel, an arm on the shaft, a pawl on the arm for engagement with the ratchet wheel, means normally holding the pawl out of engagement with the teeth of said ratchet wheel, said pawl being thrown out of engagement with its holding means by the partial rotation of the shaft, a spring for forcing the pawl into engagement with the ratchet wheel when released from the holding means whereby rotary motion is transmitted from the revolving member to the shaft, said holding means being located in the path of movement of the pawl to trip the latter at the end of a complete revolution of the shaft and thereby disconnecting said shaft from the ratchet wheel, and seed-feeding means actuated by the complete rotation of the shaft.

9. In a check-row seed planter, a frame and supporting wheels therefor, a check-row shaft coaxial with and passed through the centers of the wheels, a ratchet wheel loose on the shaft, means for transmitting motion from at least one of the wheels to the ratchet wheel, a crank arm rigidly secured to the shaft, a pawl on the crank arm movable into and out of engagement with the teeth of the ratchet wheel and normally disengaged therefrom, means brought into action by partial rotation of the shaft for throwing the pawl into engagement with the ratchet wheel whereby the shaft is rotated one complete revolution, means for disengaging the pawl from the ratchet wheel at the end of such complete revolution, and means brought into action by the revolution of said shaft for depositing the seed between the wheels.

10. In a check-row seed planter, a frame and supporting wheels therefor, a check-row shaft passed centrally through the wheels, seed reservoirs directly over the shaft, seed-separating and feeding mechanism in the bottom of the reservoir, a rotary element on the shaft, means for transmitting motion from one of the wheels to said element, additional means brought into action by the travel of the machine for rotating the shaft a part of a revolution, means brought into action by such partial rotation of the shaft for connecting it to the rotary element for rotating the shaft one revolution at a time, further means for disconnecting the shaft from the rotary element at the end of such revolution, and means for transmitting motion from the shaft to said separating and feeding mechanism.

11. In a check-row seed planter, a frame and supporting wheels therefor, a check-row shaft passed centrally through the wheels, means for rotating the shaft through part of a revolution, a ratchet wheel loose on the shaft, a radially projecting arm secured to the shaft, a pawl on the arm, means for tripping the pawl at the end of each complete revolution of the shaft, additional means actuated by each partial rotation of the shaft for shifting the tripping means from its tripping position, and further means for transmitting motion from at least one of the wheels to the ratchet wheel.

In witness whereof I have hereunto set my hand this 10th day of October 1908.

WILLIAM EDWARD GILROY.

Witnesses:
  GEO. W. LASHER,
  H. G. NEWCOMER.

Copies of this patent may be obtained for five cents each, by addressing the "Commissioner of Patents, Washington, D. C."